United States Patent
Utaki

(10) Patent No.: US 7,317,160 B2
(45) Date of Patent: Jan. 8, 2008

(54) CABLE OR THE LIKE PROTECTION AND GUIDE DEVICE

(75) Inventor: Akihiko Utaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/499,328

(22) Filed: Aug. 4, 2006

(65) Prior Publication Data

US 2007/0068694 A1   Mar. 29, 2007

(30) Foreign Application Priority Data

Sep. 29, 2005   (JP) .............................. 2005-285262

(51) Int. Cl.
*F16G 13/00* (2006.01)

(52) U.S. Cl. ......................... 174/19; 59/78.1

(58) Field of Classification Search .................. 174/19; 59/78.1; 248/49
See application file for complete search history.

(56) References Cited

U.S. PATENT DOCUMENTS

| | | | |
|---|---|---|---|
| 5,635,675 A * | 6/1997 | Houga | ........................ 174/68.3 |
| 6,516,602 B2 | 2/2003 | Sakai et al. | |
| 6,725,642 B2 | 4/2004 | Tsutsumi et al. | |
| 6,745,555 B2 | 6/2004 | Hermey et al. | |
| 6,984,782 B2 | 1/2006 | Ikeda et al. | |
| 7,204,075 B2 | 4/2007 | Utaki | |
| 2003/0182924 A1 * | 10/2003 | Tsutsumi et al. | ............ 59/78.1 |
| 2007/0163795 A1 | 7/2007 | Utaki et al. | |

FOREIGN PATENT DOCUMENTS

JP              3722477       10/2003
WO   WO 02/086349 A1    10/2002

OTHER PUBLICATIONS

U.S. Appl. No. 11/637,429, Utaki et al.

* cited by examiner

*Primary Examiner*—Chau N. Nguyen
(74) *Attorney, Agent, or Firm*—Woodling, Krost and Rust

(57) ABSTRACT

A cable or the like protection and guide device is disclosed in which inadvertent disconnection in a coupling portion of a side plate due to the repetition of flexional movements is avoided. Stress concentration is reduced in a flexion portion during restriction of flexional movements whereby excellent endurance on repeated flexion fatigue can be exhibited and in which the number of parts and the assembly operation can be reduced. Plates disposed in a right and left pair are integrally formed by a front side plate portion 111, a rear side plate portion 112, and a flexible coupling portion 113 interposed between the front side plate portion 111 and the rear side plate portion 112. The coupling portion 113 includes a thin plate-shaped central flexion allowable region 113*a* and base end continuous regions 113*b*, 113*b* with gradually increased plate thickness from the central flexion allowable region 113*a* side toward the front side plate portion 111 and rear side portion 112, respectively.

9 Claims, 8 Drawing Sheets

CABLE OR THE LIKE PROTECTION AND GUIDE DEVICE

This patent application claims priority to Japanese Patent Application No. 2005-285262 filed Sep. 29, 2005.

TECHNICAL FIELD

The present invention relates to a cable or the like protection and guide device. More specifically the invention relates to a cable or the like protection and guide device suitable for accommodating a cable or the like which supplies a movable member of an industrial machine with electric power or energy of compressed air.

BACKGROUND TECHNOLOGY

A conventional cable or the like protection and guide device such as an energy guide chain connects side plates to each other with a separate coupling element from the side plate is known and illustrated in Patent Reference 1.

Another conventional cable or the like protection and guide device connects side plates to each other by fitting a connecting rod integrally formed on each side plate to a connecting groove between side plates is also known and disclosed in Patent Reference 2.

Patent Reference 1 is Japanese Patent Indication No. 2004-527706. Patent Reference 2 is Japanese Laid-Open Patent Publication No. 2003-299238.

PROBLEMS TO BE SOLVED BY THE INVENTION

In Patent Reference 1, since a side plate and a coupling element are separately formed, a large number of parts are required which necessitates considerable assembly and maintenance. Further, in the energy guide chain as in the Patent Reference 1, since side plates are connected to each other by fitting a different element from the side plates between the side plates, there was a problem that displacements are gradually generated between a side plate and a connecting member by repetition of flexional movements between links. This causes chain damage when a side plate is disconnected. Further, in a case where the disconnection between the side plate and the coupling element in such a coupling portion does not occur, there was a problem that an excessive stress concentration is generated at the coupling portion during flexional movement whereby the coupling portion is broken.

In Patent Reference 2 since a connecting rod is formed in a protruding manner outside a side plate, the connecting rod supports a load under certain conditions such that there is a possibility that the connecting rod may break thus shortening the service life of the device. That is in the protection and guide device of the Patent Reference 2, there was a problem that a flexion portion composed of a connecting rod is broken by a load applied at the time of the restriction of flexion so that a service life of the guide device is shortened.

Further, in the protection and guide device of Patent Reference 2, since the side plates are connected to each other by fitting a connecting rod between the side plates into a connecting groove, there was a problem that displacements are gradually generated between the connecting rod between the side plates and the connecting groove by repetition of flexional movements between link bodies and the guide device is decomposed by disconnection of such a side plate at a coupling portion whereby breakage is liable to occur.

Further, in a case where the disconnection between the connecting rod and the connecting groove in such a coupling portion does not occur, there is a problem that an excessive stress concentration is generated at the base end portion during flexional movement whereby the connecting rod protruded from the side plate is broken.

Accordingly, the object of the present invention is to solve the above-mentioned problems and to provide a cable or the like protection and guide device in which inadvertent disconnection in a coupling portion of a side plate due to the repetition of flexional movements is avoided. And, stress concentration, which is liable to occur in a flexion portion during restriction of flexional movements, is dispersed, whereby excellent endurance on repeated flexion fatigue can be exhibited. Additionally, it is an object to reduce the number or parts and the amount of assembly required.

SUMMARY OF THE INVENTION

Means for Solving the Problems

The invention attains the above-mentioned object as described hereinafter. A cable or the like protection and guide device in which a number link bodies comprising pairs of right and left spaced side plates are connected to each other in a longitudinal direction. Connecting arms are bridged over flexion inner circumferential sides and flexion outer circumferential sides of said side plates in intervals. A cable or the like is accommodated in a cable accommodating space along the longitudinal direction formed by said side plates and said connecting arms. The invention is characterized in that the front side plate portion is connected to a precedent side plate, a rear side plate portion is connected to a subsequent side plate and a flexible coupling portion is interposed between the front side plate portion and the rear side plate portion. The coupling portion includes a thin plate-shaped central flexion allowable region and base end continuous regions with gradually increased plate thickness from a central flexion allowable region side toward the front side plate portion and rear side portion respectively.

The invention attains the above-mentioned object by providing a side plate having at least one linear position holding surface which holds a linear connection state of the side plate. The invention further provides a side plate having at least one flexed position restricting surface.

The invention attains the above-mentioned object by providing a concave/convex engagement mechanism which engages the side plates with each other. The engagement mechanism operates between a rear side plate portion in a precedent side plate and a front side plate portion in the side plate.

EFFECTS OF THE INVENTION

Since a number of spaced side plates are connected to each other in a longitudinal direction and connecting arms are bridged over flexion inner circumferential sides and flexion outer circumferential sides of the side plates with predetermined intervals, a cable or the like can be accommodated in a cable accommodating space along the longitudinal direction formed by the side plates and the connecting arms. Additionally, the following peculiar effects can be obtained.

The front side plate portion is connected to a precedent side plate, a rear side plate portion is connected to a subsequent side plate and a coupling portion is interposed between the front side plate portion and the rear side plate portion. The number of parts is reduced and their assembly operation is reduced.

And since the coupling portion includes a thin plate-shaped central flexion allowable region and base end continuous regions with gradually increased plate thickness from a central flexion allowable region side toward the front side plate portion and rear side portion respectively, the thin plate-shaped central flexion allowable region realizes smooth repeated flexional movement and the base end continuous regions disperse a stress concentration which is liable to occur during flexed position restriction so that excellent endurance on repeated flexion fatigue and a long life can be exhibited.

The invention attains the above-mentioned object by providing a side plate having at least one linear position holding surface which holds a linear connection state of the side plate. The invention further provides a side plate having at least one flexed position restricting surface.

Further, according to the cable or the like protection and guide device of the invention, a linear position holding surface, which holds a linear connection state of said side plate, is formed on a flexion outer circumferential side portion and flexion inner circumferential side portion. A flexed position restricting surface, which restricts the flexed connection state of said side plate, is formed on a flexion outer circumferential side portion and a flexion inner circumferential side portion of said plate, a load which is liable to occur at a coupling portion, which becomes a flexible portion during restriction of a flexed position, is avoided so that excellent endurance can be exhibited. A surface contact load between side plates which is generated during a flexed position restriction and a held linear position is dispersed into two parts of a flexion inner circumferential side and a flexion outer circumferential side of said side plate so that a linear connection state and a flexed connection state can be endurably and reliably held.

Since a concave/convex engagement mechanism which engages the side plates with each other is provided between a rear side plate portion in a precedent side plate and a front side plate portion of in the side plate, the adjacent side plates are detachable through the concave/convex engagement mechanism so that maintenance during coupling and decoupling can be easily attained.

These and other objects of the invention will be best understood when reference is made to the Brief Description Of The Drawings, Description Of The Invention and Claims which follow hereinbelow.

Figure 1:
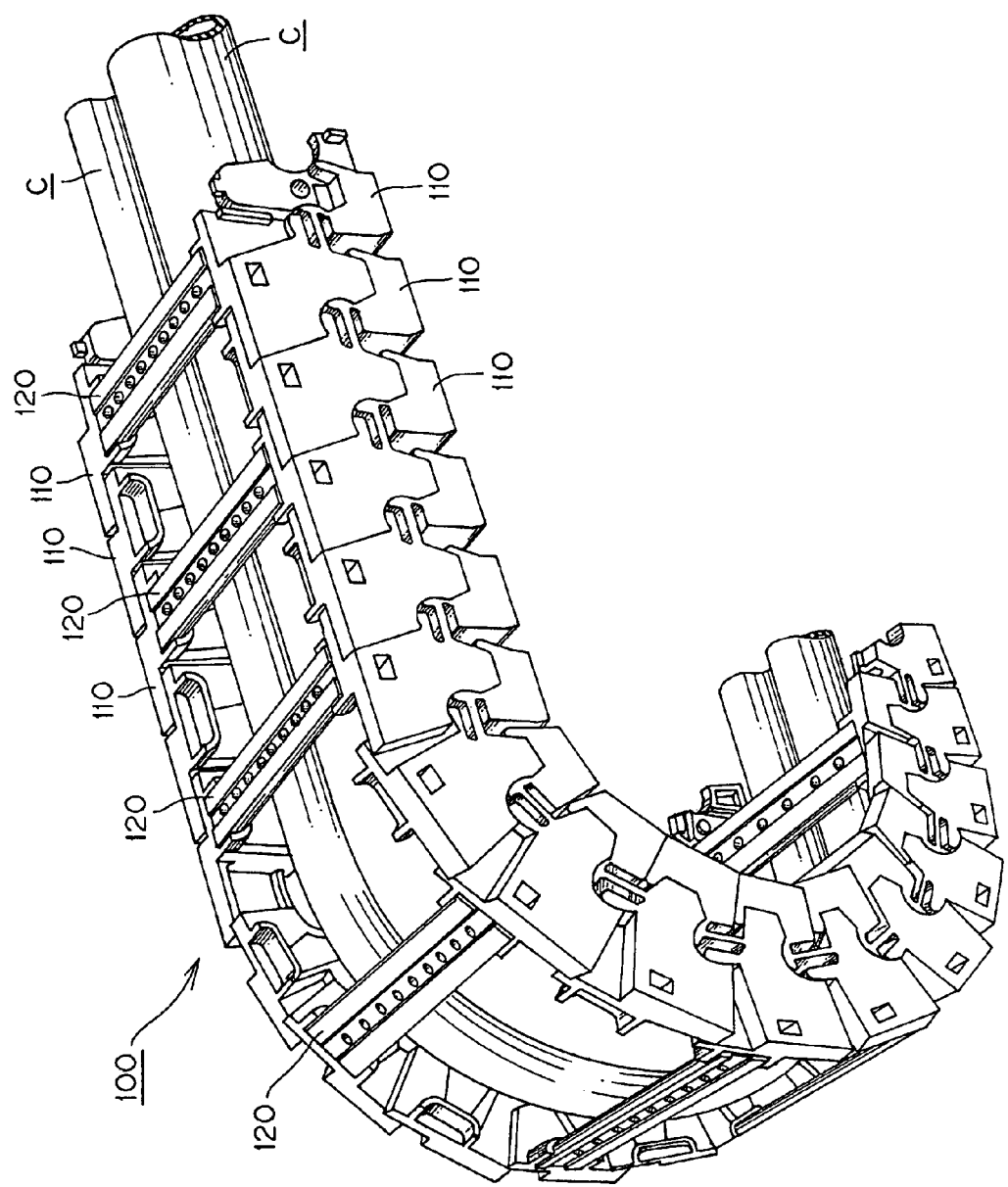
FIG. 1 is an entire perspective view of a cable or the like protection and guide device 100, which is an example of the present invention.

The drawings will be best understood when reference is made to the Description Of The Invention and Claims which follow hereinbelow.

DESCRIPTION OF THE INVENTION

A cable or the like protection and guide device according to the present invention avoids inadvertent disconnection in a coupling portion of a side plate due to repetition of flexional movements and disperses stress concentration. The stress concentration is liable to occur at a flexed portion during a flexed position restriction. Excellent endurance on a repeated flexion fatigue can be exhibited. The cable or the like protection and guide device reduces the number of manufactured parts and reduces the assembly operation. A number of right and left pairs of spaced side plates are connected to each other in a longitudinal direction and connecting arms are bridged over flexion inner circumferential sides and flexion outer circumferential sides of the side plates at predetermined intervals. A cable or the like is accommodated in a cable accommodating space along the longitudinal direction formed by the side plates and the connecting arms. The side plates are connected to a precedent side plate and a rear side plate portion connected to a subsequent side plate. Each of the side plates include a flexible coupling portion interposed between the front side plate portion and the rear side plate portion. The coupling portion includes a thin plate-shaped central flexion allowable region and base end continuous regions. The coupling portion includes gradually increased plate thickness from a central flexion allowable region side toward the front side plate portion and rear side portion respectively.

The central flexion allowable region in the coupling portion of the present invention is flexible is any size and form may be used. The base end continuous region in the coupling of the present invention has a plate thickness which gradually increases from a central flexion allowable region side toward the front side plate portion and rear side plate portion. A stress concentration which is liable to occur at a flexed portion during a flexed position restriction is dispersed and excellent endurance on repeated flexion fatigue is exhibited. For example, the base end continuous region may have a side cross-sectional shape such as a ginkgo leaf, a trumpet shape or the like.

Therefore, a side cross-section of the above-mentioned coupling portion may take a Japanese-hand drum (tsuzumi) coupling shape.

A side plate used in the present invention may be molded of any engineering plastic of resin. For example, polyamide 6 resin, polyamide 12 resin, polyamide 46 resin, polyamide 66 resin, acryl resin, polyacetal resin and the like may be preferably adopted.

The linear position holding surface and the flexed position restriction surface formed in the present invention are provided on a flexion outer circumferential side portion and a flexion inner circumferential side portion of the side plate. The linear position holding surface and the flexed position restriction surface may not be provided on the coupling portion of the side plate. For example, the linear position holding surface and the flexed position restriction surface may be formed in an end surface or a side surface of the side plate.

In a case where, for example, the linear position holding surface is formed at a flexion outer circumferential side portion and the flexed position restricting surface is formed at a flexion inner circumferential side portion, a load which would otherwise to occur at a coupling portion which becomes a flexed portion during a flexed position restriction is avoided so that excellent endurance can be exhibited and a linear connection state and a flexed connection state can be reliably maintained. Thus the device is preferable.

Further, in a case where the linear position holding surface is formed at a flexion outer circumferential side portion and at a flexion inner circumferential side portion and the flexed position restricting surface is formed at a flexion outer circumferential side portion and at a flexion inner circumferential side portion, a load which otherwise would occur at a coupling portion which becomes a flexed portion during a flexed position restriction is avoided so that a surface contact load of side plates generated during a flexed position restriction and a held linear position is dispersedly divided into two parts, that is a flexion outer circumferential side and a flexion inner circumferential side and a linear connection state and a flexed connection state can be endurably, reliably maintained. Thus the device is preferable.

The concave/convex engagement mechanism provided between a rear side plate portion of a precedent side plate and a front side plate portion of a connected side plate subsequent to the rear side plate portion in the cable or the like protection and guide device of the present invention may take any concave/convex engagement form. For instance, the concave/convex engagement constituted by an engagement protrusion or a hole to be engaged may be disposed at a front end surface or a side surface in a front side plate portion of the side plate and a portion to be engaged and an engagement protrusion may be disposed at a rear end surface or a side surface in a rear side plate portion of the side plate.

EXAMPLE 1

A cable or the like protection and guide device 100, which is an example of the present invention, will be described with reference to FIGS. 1 to 9 below.

Figure 2:
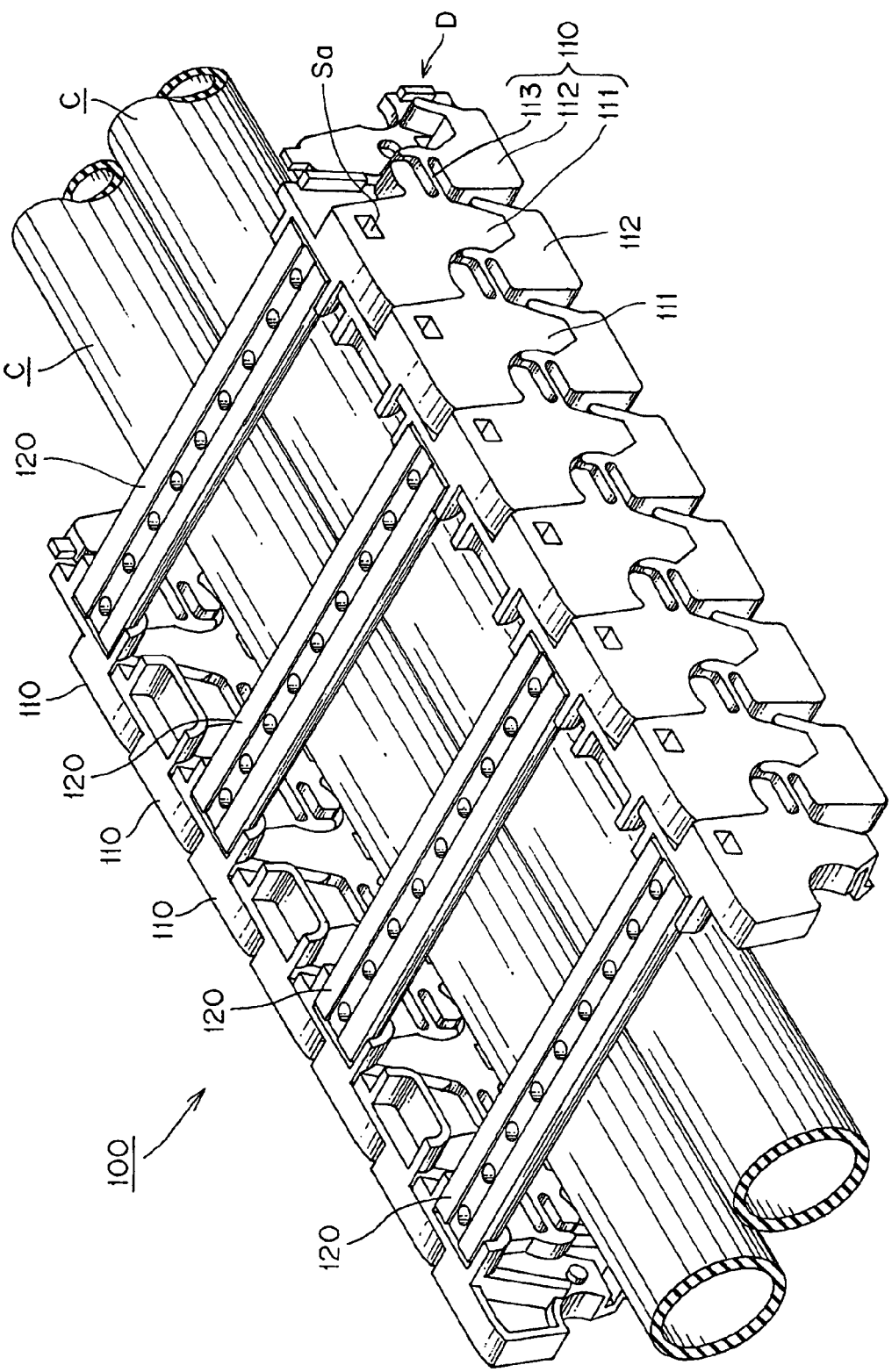
FIG. 2 is a perspective view of a linear connection state in the cable or the like protection and guide device in FIG. 1.
Figure 3:
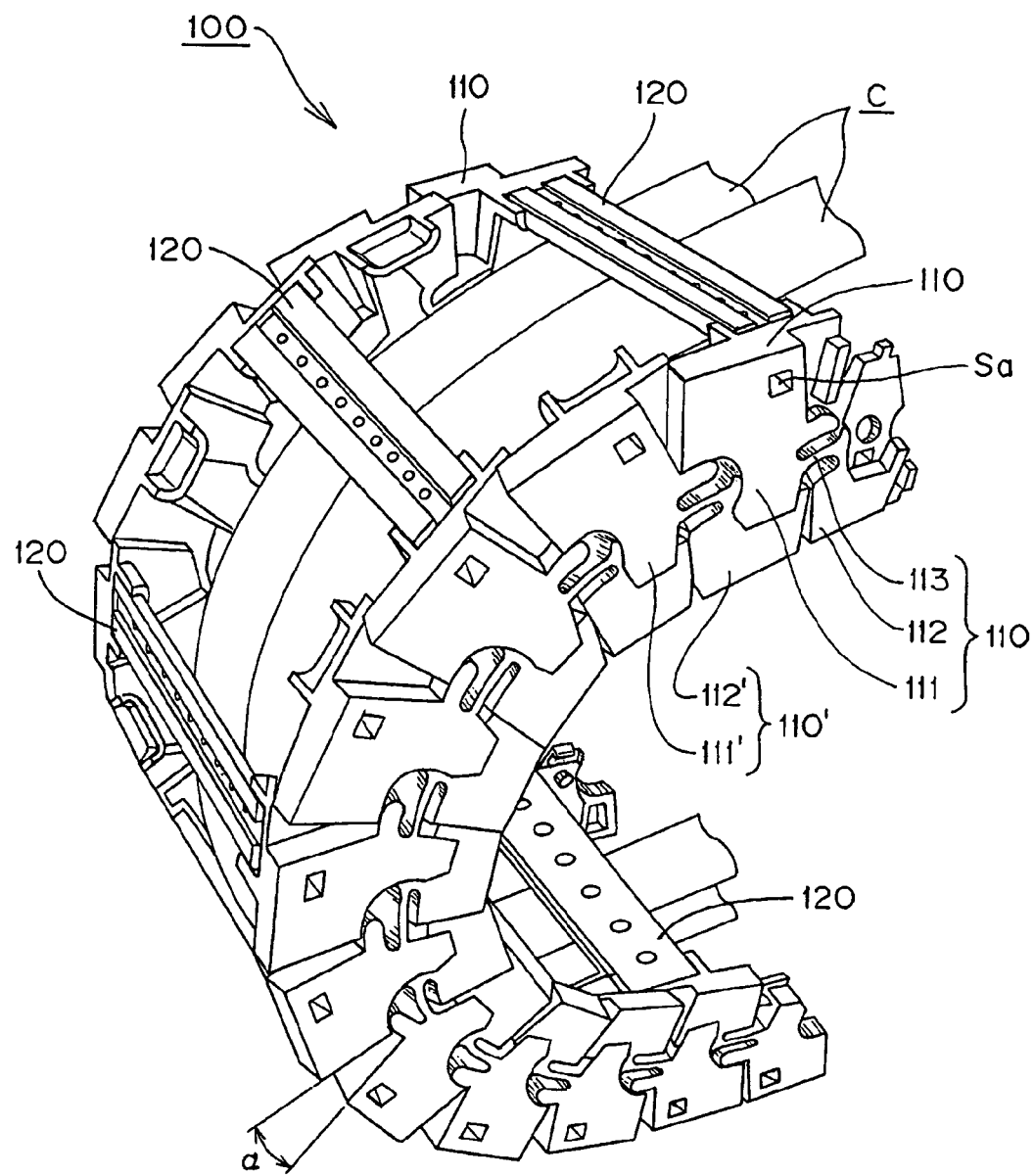
FIG. 3 is a perspective view of a flexion connection state in the cable or the like protection and guide device in FIG. 1.
Figure 4:
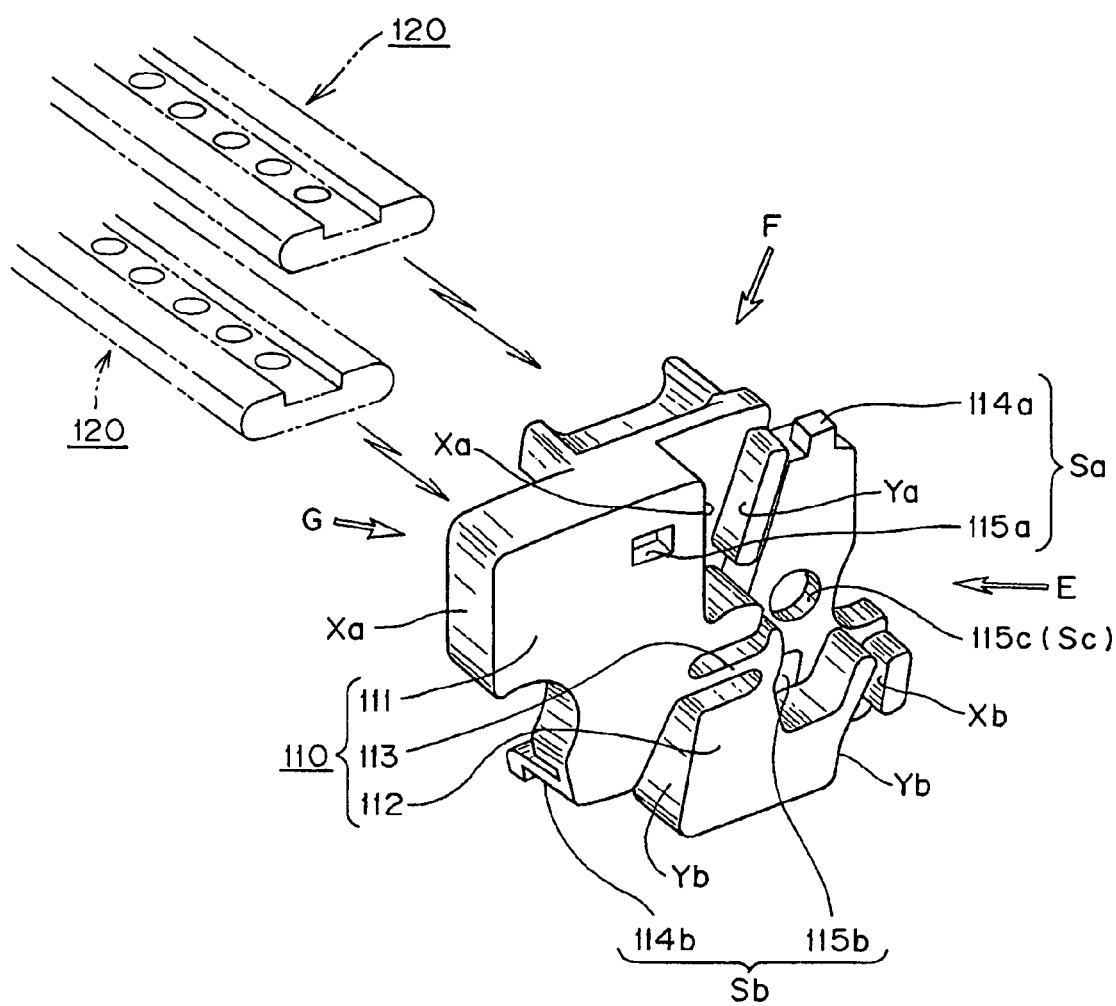
FIG. 4 is a perspective view of a side plate shown by the arrow D in FIG. 2.
Figure 5:
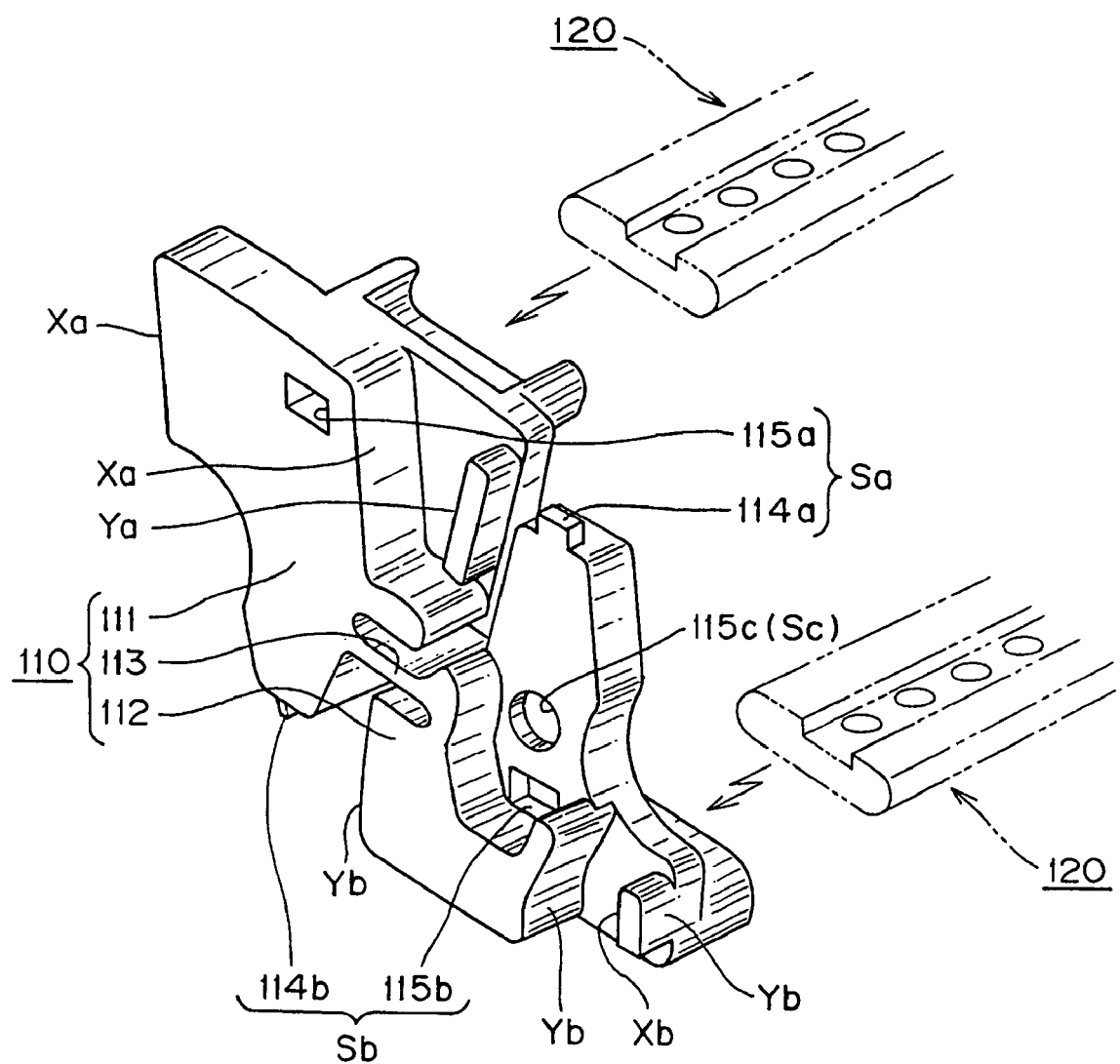
FIG. 5 is a perspective view of a side plate viewed from the E direction in FIG. 4.
Figure 6:
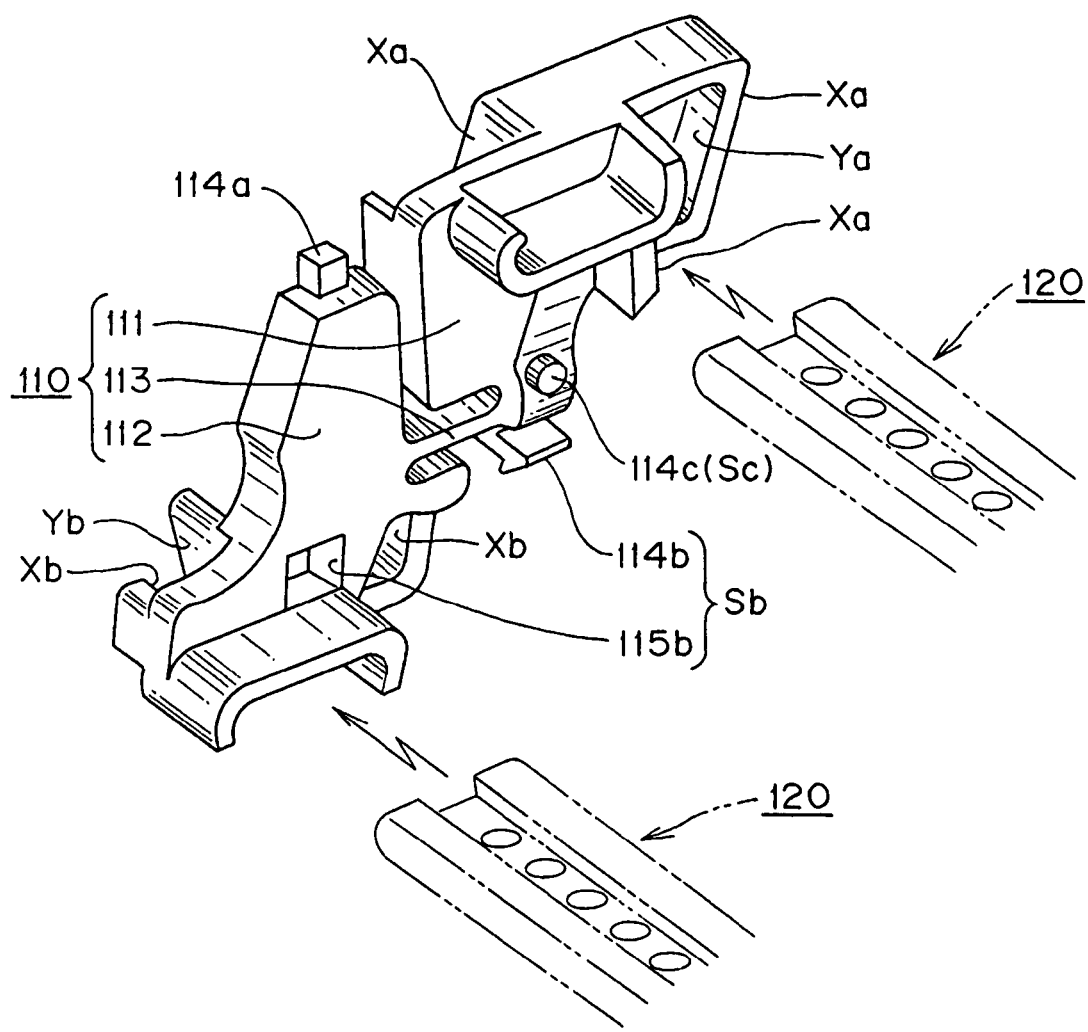
FIG. 6 is a perspective view of a side plate viewed from the F direction in FIG. 4.
Figure 7:
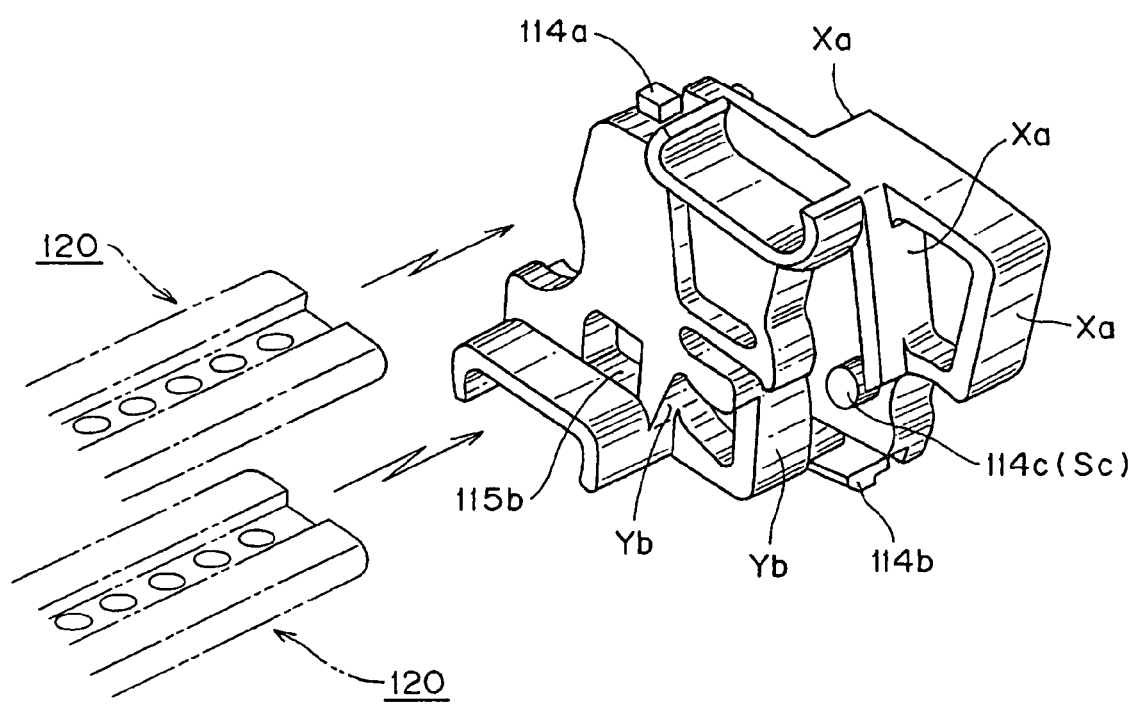
FIG. 7 is a perspective view of a side plate viewed from the G direction in FIG. 4.
Figure 8:
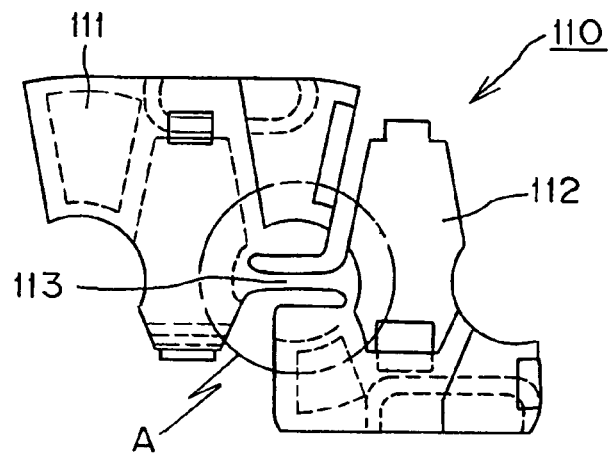
FIG. 8 is a side view of the side plate used in the cable or the like protection and guide device in FIG. 1.
Figure 9:
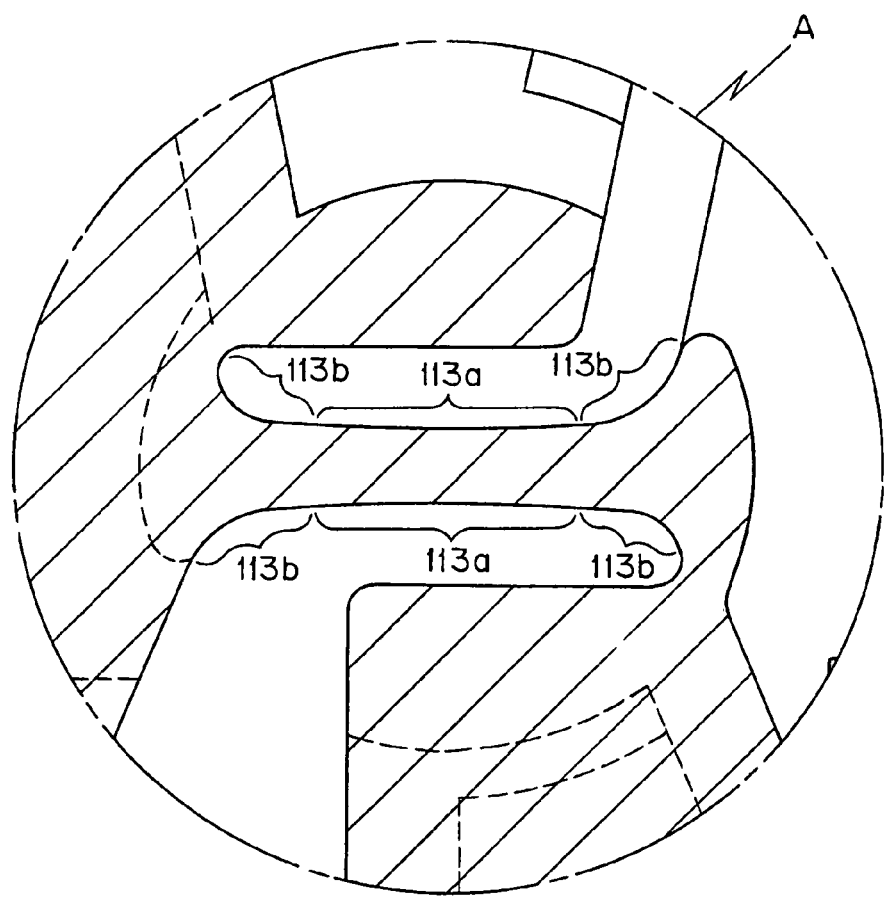
FIG. 9 is an enlarged view of a coupling portion shown in A in FIG. 8.

Here, FIG. 1 is an entire perspective view of a cable or the like protection and guide device 100 which is an example of the present invention. FIG. 2 is a perspective view of a linear connection state in the cable or the like protection and guide device 100 in FIG. 1. FIG. 3 is a perspective view of a flexion connection state in the cable or the like protection and guide device 100 in FIG. 1. FIGS. 4 to 7 are perspective views of a side plate used in the cable or the like protection and guide device 100, particularly, FIG. 4 is a perspective view of a side plate shown by the arrow D in FIG. 2, FIG. 5 is a perspective view of a side plate viewed from the E direction in FIG. 4, FIG. 6 is a perspective view of a side plate viewed from the F direction in FIG. 4, FIG. 7 is a perspective view of a side plate viewed from the G direction in FIG. 4. FIG. 8 is a side view of the side plate used in the cable or the like protection and guide device 100 in FIG. 1. FIG. 9 is an enlarged view of a coupling portion shown in A in FIG. 8.

The cable or the like protection and guide device 100, which is an example of the present invention, is used for protecting and guiding cables or the like C such as electric cables, which connect between a movable portion and a stationary portion in a semiconductor device, a pharmacy development testing device, a door opening/closing device for a vehicle, to carry out transmission and supply of electric signals, and hoses which supply pressure liquid or pressure gas. The cable or the like protection and guide device is longitudinally connected between the movable portion and the stationary portion (not shown), and further the device 100 can exhibit a linear position or a flexed position in accordance with relatively remote movement conditions between the movable portion and the stationary portion. As shown in FIGS. 1 to 3, the cable or the like protection and guide device 100 is formed in such a manner that a number of right and left pair of spaced side plates 110, 110 are connected to each other in a longitudinal direction and opposed connecting arms 120 are bridged over flexion inner circumferential sides and flexion outer circumferential sides of the side plates 110, 110 with every other side plate intervals of the connected side plates 110, 110. A cable (cables) or the like C is accommodated in a cable accommodating space with a rectangular cross-section along the longitudinal direction formed by the right and left pair of side plates 110, 110 and the connecting arms 120, 120 arranged on upper and lower positions in a bridged manner over the flexion inner circumferential side and the flexion outer circumferential side, respectively.

It is noted that in FIG. 1, the above-mentioned movable portion and stationary portion are not shown. Further, in this example, the connecting arms are bridged over the connected side plates 110, 110 on every other side plate intervals. However, the connecting arm may be bridged over a number of the side plates 110, 110 in accordance with a ratio of 1 to 1.

The side plates 110, 110 used in this example are molded using a polyamide resin and are symmetrical. The side plate 110 is integrally formed as shown in FIG. 3 by a front side plate 111, a rear side plate portion 112, and a flexible coupling portion 113 interposed between the front side plate portion 111 and said rear side plate portion 112. The side plate 110 is interconnected with other side plates as shown in FIG. 3 by a front side plate 111 connected to a precedent side plate 110' and a rear side plate portion 112 connected to a subsequent side plate 110 (not shown in FIG. 3).

Further, as shown in FIGS. 4 to 7, between the rear side plate portion 112' of the precedent side plate 110' and a front side plate portion 111 of a side plate 110 subsequently connected to the rear side plate portion 112' a flexion outer circumferential side concave/convex engagement mechanism Sa is provided. The flexion inner circumferential side concave/convex engagement mechanism Sb and the concave/convex engagement mechanism Sc are illustrated in FIG. 4 et seq. and are located in the vicinities of the flexion inner circumferential side. Side plates 110, 110, which are connected by these concave/convex engagement mechanisms Sa, Sb and Sc are detachable from each other and maintenance during the decoupling and coupling of the side plate 110, 110 can be easily attained.

That is the concave/convex engagement mechanism Sa on the flexion outer circumferential side in the example of the present invention comprises an engagement protrusion 114a composed of an engagement hook and a window-shaped hole 115a to be engaged. Hole 115a detachably engages with the engagement protrusion 114a composed of the engagement hook. The concave/convex engagement mechanism Sb adopted on the flexion inner circumferential side in the example of the present invention comprises an engagement protrusion 114b composed of an engagement hook and a window-shaped hole 115b. Hole 115b detachably engages with the engagement protrusion 114b composed of the engagement hook.

The concave/convex engagement mechanism Sc adopted in the vicinity of the coupling portion 113 of the side plate 110 comprises an engagement protrusion 114c composed of a cylindrical engagement pin and a window-shaped hole 115c. Hole 115c which detachably engages with the engagement protrusion 114c composed of the engagement pin.

Two-sets of linear position holding surfaces which hold linear connection states of the side plate 110 are employed instead of using the coupling portion to hold the linear connection states. A flexion outer circumferential side linear position holding surface Xa and a flexion inner circumferential side linear position holding surface Xb are employed rather than using the coupling portion to hold the linear connection states.

A stepped, off-set side surface Xa of a front side plate portion 111 positioned on the flexion outer circumferential side is used for holding the linear state rather than the coupling portion 113 of the side plate 110. A differently-stepped off-set side surface Xb of a rear side plate portion 112 of a side plate 110 positioned on the flexion inner circumferential side is used for restricting the flexion of the device rather than the coupling portion 113 of the side plate 110. Two-sets of linear position holding surfaces Xa and Xb, which hold linear connection states of the side plate 110, that is a flexion outer circumferential side linear position holding surface Xa and a flexion inner circumferential side linear position holding surface Xb, are used to maintain the linear connection states of the device.

Holding surfaces Xa are best illustrated in FIG. 4. Restricting surface Xb is illustrated in FIG. 4 and the corresponding restricting surface is illustrated in FIG. 6.

Two-sets of flexed position restriction surfaces Yb, Ya which restrict flexed connection states of the side plate, that is a flexion inner circumferential side flexed position restriction surface Yb and flexion outer circumferential side flexed position restriction surface Ya are employed rather than using the coupling portion to restrict the flexion movement of the device.

A stepped, off-set side surface Yb of a rear side plate portion 112 positioned on the flexion inner circumferential side is used to restrict the flexure of the device rather than the coupling portion 113 of the side plate 110. A differently-stepped off-set side surface Ya of a front side plate portion 111 positioned on the flexion outer circumferential side is used to restrict the flexure of the device rather than the coupling portion 113 of the side plate 110. Two-sets of flexed position restriction surfaces Yb, Ya, which restrict flexed connection states of the side plate, that is a flexion inner circumferential side flexed position restriction surface Yb and flexion outer circumferential side flexed position restriction surface Ya are employed to restrict the flexion movement of the device.

Holding surfaces Yb are illustrated in FIG. 4. One restricting surface Yb is illustrated in FIG. 4 and the corresponding restricting surface Yb is illustrated in FIG. 6.

The holding surfaces Xa, Xb and the restricting surfaces Ya, Yb cooperate and interengage corresponding surfaces of adjacent precedent and subsequent plates and function to prevent excessive load being applied to the coupling portion of the side plate. Additionally, the cross-sectional shape of the coupling portion as previously described herein prevents fatigue and breakage thereof. Thus, a reliable and durable side plate is disclosed which handles the loads applied thereto.

The coupling portion 113 which is the most characteristic in the cable or the like protection and guide device 100 in the example will be described in detail below with reference to FIGS. 8 and 9.

The coupling portion 113 includes a thin plate-shaped central flexion allowable region 113a and base end continuous regions 113b, 113b with gradually increased plate thickness from the central flexion allowable region 113a toward a front side plate portion 111 and a rear side plate portion 112, respectively, and it has a side cross-section of a Japanese hand drum (tsuzumi) shape as a whole.

The central flexion allowable region 113a experiences smooth repeated flexion movements. The base end continuous regions 113b, 113b disperse the stress concentration which occurs during a flexed position restriction so that excellent endurance on repeated flexion fatigue and a long life are exhibited.

It is noted that if the base end continuous regions 113b, 113b of the example has a side cross-section of a gradually increased plate thickness without forming corner portions toward the front side plate portion 111 and the rear side plate portion 112 so that stress concentration is dispersed. Any forms of the base end continuous regions may be used. For example, the base end continuous region may have a side cross-sectional shape such as a ginkgo leaf, a trumpet shape or the like.

As described above, in the cable or the like protection and guide device 100 of the second example, while the flexion inner circumferential side flexed position restriction surfaces Yb and the flexion outer circumferential side flexed position restriction surfaces Ya are respectively opened during linear position holding as shown in FIG. 2, the flexion outer circumferential side linear position holding surfaces Xa and the flexion inner circumferential side linear position holding surfaces Xb are respectively brought into contact with surfaces Xa and Xb of the next adjacent side plate so that a linear position can be reliably maintained without applying a load to the coupling portion 113. Further, while the flexion outer circumferential side linear position holding surfaces Xa and the flexion inner circumferential side linear position holding surfaces Xb are respectively opened during flexed position restriction as shown in FIG. 3, the flexion inner circumferential side flexed position restriction surfaces Yb and the flexion outer circumferential side flexed position restriction surfaces Ya are respectively brought into contact with each other so that a flexed position can be reliably maintained without applying a load to the coupling portion 113.

It is noted that the maximum opening angles α between the flexion inner circumferential side flexed position restriction surfaces Yb and between the flexion outer circumferential side flexed position restriction surfaces Yb in the second example can be determined in accordance with the number of the side plates 110 continuously forming a flexed position and the flexional radius.

Therefore, the cable or the like protection and guide device 100 of the second example reduces the number of parts required and provides easy assembly while avoiding inadvertent disconnection at the coupling portion 113. Further, since adjacent side plates 110, 110 are detachably connected by three-sets of concave/convex engagement mechanisms Sa, Sb and Sc respectively provided on the flexion outer circumferential side and the flexion inner circumferential side, the device 100 can be easily maintained during decoupling and coupling of the side plates 110, 110.

Further, the central flexion allowable region 113a in the coupling portion 113, which flexes during a flexed position restriction, realizes smooth repeated flexion movements and the stress concentration which occurs at the base end continuous regions 113b, 113b is dispersed so that excellent endurance on repeated flexion fatigue can be exhibited. And since a surface contact load of the side plates, which occurs during the flexed position restriction and held linear position, is divided into the flexion outer circumferential side and the flexion inner circumferential side, the device 100 endurably and reliably maintains the linear connection state and flexed connection state. Thus the effects of the present invention are very large.

DESCRIPTION OF REFERENCE NUMERALS

100 . . . Cable or the like protection and guide device
110 . . . Side plate
111 . . . Front side plate portion
112 . . . Rear side plate portion
113 . . . Coupling portion
113a . . . Central flexion allowable region
113b . . . Base end continuous region
114a . . . Flexion outer circumferential side engagement protrusion
114b . . . Flexion inner circumferential side engagement protrusion
115a . . . Flexion outer circumferential side hole to be engaged
115b . . . Flexion inner circumferential side hole to be engaged
114c . . . Engagement protrusion
115c . . . Hole to be engaged
120 . . . Connection arm
Sa, Sb, Sc . . . Concave/convex engagement mechanism
Xa . . . Flexion outer circumferential side linear position holding surface
Ya . . . Flexion outer circumferential side flexed position restriction surface
Xb . . . Flexion inner circumferential side linear position holding surface
Yb . . . Flexion inner circumferential side flexed position restriction surface
C . . . Cable (Cables) or the like
α . . . Maximum opening angle between flexed position restriction surfaces While the invention has been described by way of Examples those skilled in the art will readily recognize that changes may be made to the invention without departing from the spirit and scope of the appended claims.

The invention claimed is:

1. A cable protection and guide device in which a number of link bodies are connected to each other in a longitudinal direction, each of said link bodies includes a pair of side plates, each side plate includes an inner circumferential side and an outer circumferential side, connecting arms are bridged over said inner circumferential sides and said outer circumferential sides of said side plates in predetermined intervals such that a cable is accommodated in a cable accommodating space along the longitudinal direction, said cable being surrounded by said side plates and said connecting arms, characterized in that said side plates are integrally formed by a front side plate portion connected to a precedent side plate, a rear side plate portion connected to a subsequent side plate and a flexible coupling portion interposed between said front side plate portion and said rear side plate portion, said flexible coupling portion being integrally formed with said side plate, said front side plate portion and said rear side plate portion include offset portions thereof, and said coupling portion includes a thin plate-shaped central region and base end continuous regions with gradually increasing plate thickness from said central region toward said front side plate portion and rear side plate portion respectively.

2. A cable protection and guide device according to claim 1 characterized in that each of said side plates includes a first linear position holding surface formed on said outer circumferential side portion of said side plate and a second linear position holding surface formed on said inner circumferential side portion of said side plate; a first flexed position restricting surface is formed on said outer circumferential side portion of said side plate and a second flexed position restricting surface is formed on said inner circumferential side portion of said side plate.

3. A cable protection and guide device according to claim 2 characterized in that a concave/convex engagement mechanism is provided between said rear side plate portion in a precedent side plate and a front side plate portion in a subsequent side plate such that said side plates are continuously connected to said rear side plate portion.

4. A cable protection and guide device according to claim 1 characterized in that a concave/convex engagement mechanism is provided between said rear side plate portion in a precedent side plate and a front side plate portion in a subsequent side plate such that said side plates are continuously connected to said rear side plate portion.

5. A cable protection and guide device comprising: a plurality of link bodies connected together; each of said link bodies includes a pair of side plates; each of said side plates includes an inner side portion and an outer side portion; connecting arms bridging said inner and outer side portions of said side plates; each of said side plates includes a front portion, a rear portion and a coupling portion, said coupling portion of said side plates interconnects said front and rear portions of said side plates together, said flexible coupling portion being integrally formed with said side plate, said front side plate portion and said rear side plate portion include offset portions thereof, said coupling portion includes a thin central region which includes a thin cross-section and base end regions which are thicker in cross-section than said central region.

6. A cable protection and guide device as claimed in claim 5 wherein said coupling portion gradually increases in cross-sectional thickness from said central region toward said front side plate portion and rear side portion respectively.

7. A cable protection and guide device as claimed in claim 6 wherein each of said side plates includes at least one holding surface and at least one restricting surface.

8. A cable protection and guide device as claimed in claim 5 wherein each of said side plates includes at least one holding surface and at least one restricting surface.

9. A cable protection and guide device as claimed in claim 5 wherein each of said side plates includes at least two holding surfaces and at least two restricting surfaces and wherein each of said holding surfaces interengage corresponding holding surfaces of adjacent side plates and wherein each of said restricting surfaces interengage corresponding restricting surfaces of adjacent side plates.

* * * * *